United States Patent
Sharkasi et al.

(10) Patent No.: US 6,231,901 B1
(45) Date of Patent: May 15, 2001

(54) FROZEN DESSERT NOVELTY WHICH CHANGES COLOR

(75) Inventors: Tawfik Yousef Sharkasi; George Tonner; Eric Best, all of Dublin, OH (US); Shantha Chandrasekaran Nalur, Danbury, CT (US); Monika Gaelweiler, St. Katharinen (DE)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/274,546

(22) Filed: Mar. 23, 1999

(51) Int. Cl.⁷ ............................... A23G 9/00; A23G 9/04; A23G 9/24
(52) U.S. Cl. .................. 426/101; 426/100; 426/249; 426/250; 426/540; 426/565
(58) Field of Search .................. 426/565, 99, 100, 426/101, 249, 250, 240

(56) References Cited

U.S. PATENT DOCUMENTS

| | | | |
|---|---|---|---|
| 2,288,970 | * | 7/1942 | Weisbender . |
| 2,524,291 | * | 10/1950 | Hoffman . |
| 2,686,722 | * | 8/1954 | Goldstein . |
| 3,322,545 | * | 5/1967 | Siehrs . |
| 3,623,889 | * | 11/1971 | Falconer . |
| 3,867,556 | * | 2/1975 | Darragh et al. . |
| 3,971,853 | | 7/1976 | Crowder ............... 426/249 |
| 4,310,559 | * | 1/1982 | Mita et al. . |
| 4,738,862 | * | 4/1988 | Bee . |
| 4,853,235 | * | 8/1989 | Tomomatsu . |
| 4,999,208 | * | 3/1991 | Lengerich et al. . |
| 5,343,710 | | 9/1994 | Cathenaut et al. ............... 62/71 |
| 5,394,705 | * | 3/1995 | Torii et al. . |
| 5,516,540 | | 5/1996 | Cathenaut ............... 426/249 |
| 5,538,745 | * | 7/1996 | Tapfer et al. . |
| 5,728,419 | | 3/1998 | Caron et al. ............... 426/565 |
| 5,783,239 | * | 7/1998 | Callens et al. . |
| 5,876,995 | * | 3/1999 | Bryan . |
| 5,958,481 | * | 9/1999 | Hodges . |
| 6,004,615 | * | 12/1999 | Kim et al. . |

FOREIGN PATENT DOCUMENTS

| | | | |
|---|---|---|---|
| 0674841 | 3/1994 | (EP) | ............... A23G/9/02 |
| 1573397 | 5/1969 | (FR) | ............... A23G/5/00 |
| 3195462 | 8/1991 | (JP) | ............... A23L/1/03 |

OTHER PUBLICATIONS

Database Abstract, Derwent Information Ltd., WPI Acession No. 91–292601/199140, XRAM Accession No. C91–126711, abstract of KOGYO Japanese Patent Application (Kokai) 3–195462 (1991).

* cited by examiner

Primary Examiner—Cynthia L. Nessler
(74) Attorney, Agent, or Firm—Vogt & O'Donnell, LLP

(57) ABSTRACT

A frozen confectionery product which changes color has first and second frozen confectionery product compositions arranged for being consumed together. In an embodiment, the first composition has an acidic pH and contains a colorant component which colors the first composition and which, upon an increase in pH, changes color, and the second composition has a pH so that upon a mixing with the first composition, the pH of the first composition and colorant mixed with the second composition increases so that the colorant changes color, and each composition may contain a differing coloring component for obtaining a different coloration upon mixing. In another embodiment, coatings which are impermeable to water but lickable for consumption, particularly such as a fat-based composition, are layered on a core of an ice confectionery composition, and at least one coating contains a water-soluble colorant component so that upon licking for consumption, colorant is released from the coating for providing coloration, and multiple coatings may be employed which contain differing colorant components so that upon a mixing, a further different coloration is obtained.

20 Claims, 1 Drawing Sheet

FROZEN DESSERT NOVELTY WHICH CHANGES COLOR

BACKGROUND OF THE INVENTION

Ice cream and water ice products novelties may come in various shapes, colors and flavors. They may be extruded or moulded, presented in cups or moulded in various shapes as stick bars. In order to be more attractive to consumers, they are often presented in decorative shapes, such as ripples in cups or as stick bars with stripes or stripe coatings representing various patterns.

Japanese Patent Specification JP-A-3195462 is concerned with a food and drink which changes color and which comprises a pH sensitive colorant together with a pH regulating agent. The food and drink product consists of sugar solutions with various colorants that change color when an acid or a base is added as a pH regulator and agitated. There is no disclosure of a food product which is capable of changing color upon eating with the reactant phases already in place.

SUMMARY OF THE INVENTION

The objective of the invention is to provide a color conversion frozen confectionery novelty which is particularly attractive to children in that it offers a unique added sensory stimulus to the enjoyment of frozen dessert novelties in the fun and magic category.

The present invention provides a frozen dessert comprising distinct frozen layers, zones or particles which change color while eating and processes for preparing it.

With more particularity, in one embodiment, the frozen dessert is a confectionery product which comprises first and second frozen confectionery product compositions arranged for being consumed together, such as in an article having distinct layers or zones or having distinct particles arranged together or such as for dispensing for being mixed together, and wherein the first composition has a low, an acidic, pH and contains a colorant component which colors the first composition and which is pH-sensitive and wherein the second composition has a pH higher than that of the first composition so that upon a mixing of all or portions of the first and second compositions together, the colorant changes color.

In an embodiment, the frozen composition which has the higher pH does not contain an added colorant component, but in other embodiments, the frozen composition which has the higher pH also contains a colorant component and that colorant also may be pH-sensitive.

The present invention also includes a frozen dessert confectionery article which comprises a core and one confectionery composition coating on the core or multiple confectionery composition coatings layered on the core wherein the coatings comprises a substance which is impermeable to water and which is, preferably, fat-based and wherein at least one coating contains a water-soluble colorant component, and with multiple colorant containing coatings, each coating contains differently colored colorant components.

DETAILED DESCRIPTION OF THE INVENTION

In an embodiment of the present invention which comprises "distinct particles", the first and second frozen dessert compositions are separate frozen particles which may be used to fill a mold or cup, and in the context of the present invention, "distinct particles" are such as frozen granulates such as "granitas".

In the embodiment which comprises a frozen core, the frozen dessert may be in the form of a stick bar, and the coating comprises a low melting point fat into which a water-soluble dye is dispersed.

In the frozen dessert, the coating may be applied in stripes or decorative patterns.

The frozen dessert may comprise multiple coatings around a core, such as a double coating, in which case a first coating containing a first water-soluble colorant encapsulated into it is applied around the core and a second coating containing a second water-soluble colorant encapsulated into the second coating is applied in stripes or decorative patterns onto the first coating.

A process for preparing the frozen confectionery dessert product which contains a pH-sensitive colorant component comprises freezing a first ice mix having a low pH and containing a water-soluble colorant component which is pH-sensitive and freezing a second confectionery composition having a pH higher than the first composition so that upon a subsequent mixing of the first and second compositions, the colorant changes color, and forming the first and second frozen mixes in distinct zones, distinct layers or distinct particles into an article of frozen confectionery.

In one embodiment, which is particularly suitable for a soft serve, e.g. for food service, the process comprises forming a first frozen mix and a second frozen mix into an article of frozen confectionery through coextrusion into a cup or mold.

In the case of soft serve, the principle is the pH change that occurs during stiring. This causes a color change to pH sensitive colors in the product. At low pH, of about 3, a water-ice recipe may be used in combination with a regular or low fat ice cream mix recipe with a pH near neutrality, e.g. of about 6.2 to 6.4. When these two are co-extruded or scooped into the same bowl together, and stirred, the pH equilibrates to a value between the two extremes. The ice cream and water ice could be sold separately, frozen simultaneously in separate barrels, and swirled together out of the freezer for immediate consumption at about −5° C. another option is to freeze and package separately in bulk. The customer would scoop the two together as needed.

In another embodiment the process comprises forming said first frozen mix and said second frozen mix into an article of frozen confectionery by alternately filling them in vertical layers into a cup or mold.

Interlayer barriers, i.e. edible barriers against unfrozen water migration such as chocolate or compound coatings may be used, e.g. to keep a water-ice and an ice cream portion separate, in order to avoid their mixing together in the case of heat shocks. One can also use specific container designs, such as a break-away or removable partition or a permanent partition in a cup within a cup.

In an embodiment, which is suitable for moulded stick bars, the process comprises forming said first frozen mix and said second frozen mix into an article of frozen confectionery by filling a freezable first ice mix with a low pH containing a water-soluble colorant which is pH sensitive, into a mold, partially solidifying the said first ice mix within the mold so that a mold shell forms about unsolidified mix, sucking out the unsolidified mix from the shell and mold, filling a freezable second similar dessert mix without a colorant and buffered to a higher pH into the mold, and inserting a stick, final freezing and demoulding.

In a further embodiment, which is adapted to moulded as well as extruded stick bars, the preparation of the frozen dessert comprises forming a first frozen core from a frozen dessert mix without a colorant and coating the core with at least one coating containing a substance impermeable to water in which a water-soluble colorant is encapsulated by dipping or spraying.

In this embodiment, the process may comprise further applying a second coating containing a second water-soluble colorant encapsulated into the second coating in stripes or decorative patterns onto the first coating.

In a further embodiment of the preparation of moulded and coated stick bars, the process comprises forming the frozen dessert by filling a coating composition containing a substance impermeable to water in which a water-soluble colorant is encapsulated, into a mold, partially solidifying the coating composition within the mold so that a mold shell forms about unsolidified coating composition, sucking out the unsolidified composition from the shell and mold, filling a freezable dessert mix without a colourant into the mold, inserting a stick, completing the coating of the upper surface, final freezing and demoulding.

In this latter embodiment the process may comprise further applying a second coating containing a second water-soluble colorant encapsulated into the second coating in stripes or decorative patterns onto the first coating.

In another embodiment of a simple or multiple coating, the process may comprise applying several colors, preferably two, of which one is water-soluble and the other is a fat-soluble color or a lake. The fat-soluble color or lake gives the initial color of the coating. When the bar is licked, the water-soluble color may give a different, preferably contrasting color to the tongue and also a little on the coated bar.

For coating, one may use a method of stripe coating which basically comprises applying a soft coating containing dispersed water-soluble color(s) in stripes on the bar surface. The dye may thus be incorporated into the water phase of a water-in-oil emulsion or dispersed in a substance which is impermeable to water such as a fat, e.g. a chocolate or a confectionery compound, preferably in an amount of about 0.1 to >1% by weight. The coating may be applied to the bar in stripes in a regular pattern or in a random pattern e.g. by spraying or by using DAZZLE technology. The functionality principles include encapsulation and differential solubility properties. The color is released by licking, in being drawn out of the coating onto the bar ice cream surface between the coating stripes.

As an alternative coating, one may use powdered coating, e.g. a fat powder which may be produced by dispersing a water-soluble dye into a low-melting point fat which is molten beforehand. As preferred fats, one may use coconut fat, partially hydrogenated coconut fat or a medium chain triglyceride. After thoroughly mixing, e.g. in a bowl, the dispersion is cooled down below the melting point of the fat while the hardened fat layers from the surface are scrapped off. As an alternative one may use spray chilling. This produces small particles of fat with encapsulated color particles. The solid fat particles may be then blended with powdered sugar, sieved and deposited on the product.

The coating may also contain a fat-soluble color or lake which then gives the color to the coating. A lake may consist of a substratum of alumina hydrate on which a water-soluble color, i.e. a dye, is absorbed or precipitated. The amount of fat soluble color or lake may vary from 0.05 to 1%, preferably from 0.1 to 0.25% by weight of the coating, depending on color properties and intensity.

The coating may be applied in a regular pattern or in a random pattern and it may be created by using DAZZLE technology.

Since the dye is not soluble in the fat, its color is not manifested until it is released from the fat which is then molten by licking.

Thus, the color changing principles include the combined effects of solubility properties of color, e.g. increased intensity of a water-soluble color in going from an anhydrous to a hydrated state, encapsulation in fat to protect the color from moisture until licked and light scattering of small particles to give a light color.

In the present description the term "coating" does not imply that the frozen confectionery article is necessarily enrobed with a coating on its surface. The coating may be in the form of layers or inclusions within the body of the article.

BRIEF DESCRIPTION OF THE DRAWING FIGURES

EXAMPLES AND DETAILED DRAWING DESCRIPTION

Figure 1:
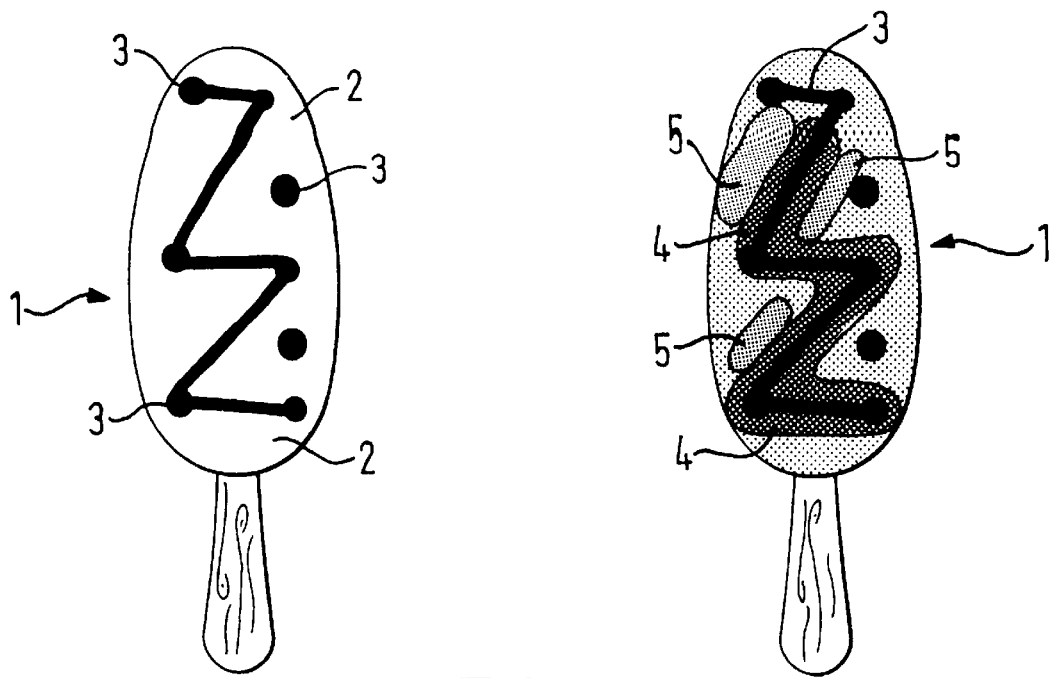
FIG. 1 is a plan view of a stick bar with stripes of coating before and after licking.

The following examples wherein parts and percentages are by weight, further illustrate the present invention.

Example 1

A water-ice first mix recipe with a depressed freezing point containing 35% invert sugar, 5% dextrose, 1% pectin with 0.5% red cabbage extract (anthocyanin), the rest being water is ajusted to pH 3 with malic acid.

A similar second mix recipe is prepared in a pH 7 phosphate/NaOH buffer aqueous solution (replacing water in the first recipe) and without color and acid. Both mixes are frozen on a batch freezer and alternately filled in several vertical layers in a cup.

The layers are hardened with liquid nitrogen between dosing. Subsequent tempering to −10° C. produces a soft, stirrable texture. Upon stirring with a spoon, the color changes from red to blue-violet in 5–10 s.

Example 2

A similar procedure to that of Example 1 is followed except that the red cabbage extract is substituted with an orange cochineal extract at 0.7% in the first mix recipe. The resultant color change upon stirring is from orange to red in 5–10 s.

Example 3

The first mix recipe of Example 1 is filled in a mold and is partly frozen in the mold in a brine bath. After formation of a shell at the mold interior surface, the unfrozen liquid center is sucked out and the thus formed center cavity of the ice shell is hardened with liquid nitrogen. While the mold remains in the brine bath the center cavity is then filled with pH 7 colorless second mix recipe of Example 1 and frozen while a stick is inserted and the whole frozen composite bar is demoulded.

Sucking the end of the bar produces some color change at the interface and streaks into the clear center layer.

Examples 4–8

A water-ice first mix recipe of pH 3 is frozen in a barrel. A second mix consisting of regular ice cream with a pH 6.2–6.4 is frozen in a separate barrel. These two are scooped into the same bowl together or co-extruded and swirled together out of a soft serve freezer for immediate consumption at −5° C. When stirred, the resulting color is obtained as indicated in Table 1.

TABLE 1

| Example | First mix | Second mix | Stirred product |
|---|---|---|---|
| 4 | red cabbage | white | blue/violet |
| 5 | orange cochineal | white | red |
| 6 | red cabbage | tumeric ytellow | green |
| 7 | orange annatto | red cabbage | light cabbage |
| 8 | orange cochineal | red cabbage | red |

In Examples 4–8 the color of the stirred product is unexpected when it is compared with scoops of the same color but with different pH sensitiveness:

Example 4: If red beet (pH insensitive) is used for the first mix, the resulting color is pink as expected.

Example 5: If orange annatto (pH insensitive) is used for the first mix, the resulting color is light orange as expected.

Example 6: If red beet is used for the first mix and turmeric yellow (pH insensitive) for the second mix, the resulting color is orange as expected.

Example 7: If orange annatto is used for the first mix and red beet for the second, the resulting color is reddish orange as expected.

Example 8: If orange annatto is used for the first mix and red beet for the second, the resulting color is reddish orange as expected.

Example 9

The accompanying FIG. 1 illustrates a double coated extruded stick bar 1 enrobed in a first white color fat coating 2 and with stripes of a second dark color fat coating 3 applied on the first coating 2 using a DAZZLE technique. The extruded stick bar is prepared in the conventional way and after hardening it is dipped into a first light color fat coating. After hardening of the first coating, a second dark color fat coating is applied in stripes of regular pattern.

The first coating 2 is prepared by dispersing 0.1% of a Red 40/Allura Red AC dye powder into a typical soft white coating recipe containing a low-melting-point fat that has been melted.

The second coating 3 is prepared in the same way by dispersing 0.1% of a yellow 5 Tartazine dye powder into a typical soft dark coating recipe containing a low-melting-point fat that has been melted.

The licked bar in FIG. 1 on the right illustrates the yellow color being drawn out of the dark coating in the areas 4 between the stripes 3 and the red color being drawn out of the light coating in the areas 5 after several licks.

Example 10

Figure 2:
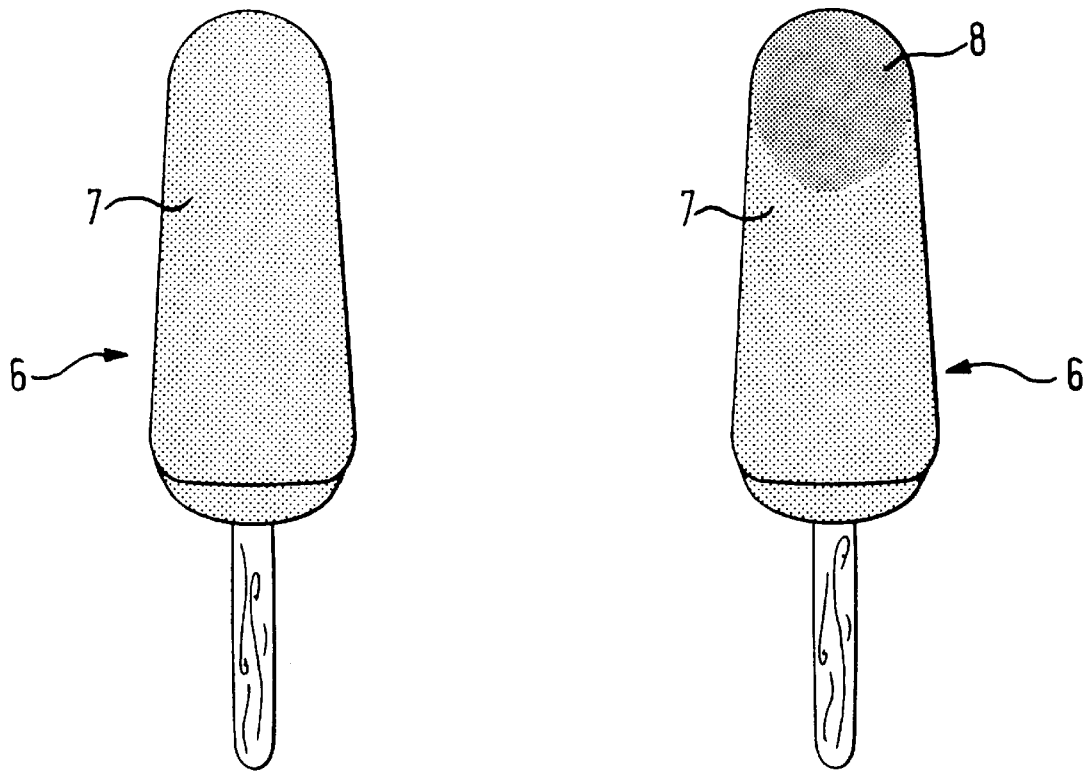
FIG. 2 is a plan view of a stick bar with a uniform coating before and after licking.

The accompanying FIG. 2 illustrates a single coating of a moulded stick bar 6. The moulded stick bar 6 is coated with a light yellow fat coating 7. The stick bar is prepared in the conventional way in a stick moulding machine and after demoulding it is hardened and a powdered fat coating is dusted on the product surface.

For preparing the coating powder, 5 g molten coconut fat is mixed with 0.03 g Red 40/Allura Red AC dye. The mixture is scraped while cooling with a wire whip from the surface of a stainless steel bowl immersed in an ice bath, 3 g dextrose is added and thoroughly mixed with the fat particles containing the encapsulated dye and the mixture is sieved through a 8 mm screen.

The licked bar in FIG. 2 on the right illustrates the red color being drawn out of the light yellow coating in the area 8 already with one lick.

Example 11

A powdered fat coating for dusting is prepared as in Example 10 but a water soluble Blue 1 (brillant blue FCF) is encapsulated into a fat powder. A strawberry powder is then added to give the powder a nice taste and to get color change from red to blue. Color release is good and in some places red and blue mix together to give a violet color.

Examples 12–13

12. An extruded ice cream center (80% overrun) supported on a stick is made and maintained at −20 to −30° C. The bar is dipped into a coating having the composition shown in Table 2 hereinafter maintained at 20° C. and wherein a water-soluble color and a fat-soluble lake are incorporated by simply mixing in the flowable coating.

13. A moulded ice cream bar on a stick is made and likewise dipped into the coating of the composition given in Table 2, except that the fat-soluble color is a white lake of titanium dioxide at a concentration of 0.25%.

TABLE 2

| Ingredient | % |
|---|---|
| Cocoa liquor | 10.9 |
| Sugar | 30.5 |
| Sweet whey | 9.8 |
| Coconut oil (M.P. 24.5° C.) | 32 |
| Vanillin | 0.03 |
| Anhydrous butter fat | 4 |
| Partially hydrogenated soya oil | 11.77 |
| Lecithin | 0.5 |
| Water-soluble color (FD & C green 3) | 0.25 |
| Fat-soluble color (FD & C red 3 & 40 lake on alumina hydrate) | 0.25 |

When licked, the red stick bar of Example 12 gives a green color on the tongue. When licked, the white stick bar of Example 13 gives a green color on the tongue and a contrasting green color on the places where the stick bar is licked.

What is claimed is:

1. A composite frozen confectionery product comprising first and second frozen confectionery product compositions arranged for being consumed together wherein the first frozen composition has an acidic pH and contains a colorant component which colors the first composition and which, upon an increase in pH, changes color and wherein the second frozen composition has a pH so that upon a mixing with the first composition, the pH of the first composition and colorant mixed with the second composition increases so that the colorant changes color.

2. A frozen confectionery product according to claim 1 wherein the second composition contains a colorant component and wherein the second composition colorant component is different from the first composition colorant component.

3. A frozen confectionery product according to claim 2 wherein the first and second composition colorant components are colorants so that upon a mixing of the two compositions, the colorants change color to a further different color.

4. A frozen confectionery product according to claim 1 or 3 wherein the first composition has a pH of about 3 and wherein the second composition has a pH of about 6.2 to 6.4.

5. A frozen confectionery product according to claim 1 wherein the second composition does not contain an added colorant component.

6. A frozen confectionery product according to claim 1 wherein the first and second compositions are arranged in a layered arrangement.

7. A frozen confectionery product according to claim 6 wherein the first composition is a water-ice composition.

8. A frozen confectionery product according to claim 7 further comprising an edible moisture barrier substance layer positioned between layers of the first and second compositions.

9. A frozen confectionery product according to claim 1 or 3 or 6 wherein the first and second compositions are compositions which are stirrable together at a temperature as low as −10° C.

10. A frozen confectionery product according to claim 1 or 3 wherein the first and second compositions have a form of distinct particles arranged together.

11. A frozen confectionery product according to claim 1 wherein the first composition colorant component is water-soluble.

12. A frozen confectionery product according to claim 3 or 11 wherein the second composition colorant component is water-soluble.

13. A frozen confectionery product according to claim 1 or 3 wherein the first and second compositions are arranged in a form of an article so that the second composition is a core of the article and the first composition is a core coating.

14. A frozen confectionery product according to claim 1 further comprising a further frozen confectionery product composition which forms a product core and wherein the first composition is coated on the core and the second composition is coated on the first composition.

15. A frozen confectionery product according to claim 14 wherein the second composition is coated only upon portions of the first composition.

16. A frozen confectionery product according to claim 15 wherein the first and second composition colorant components are water-soluble.

17. A frozen confectionery article comprising a confectionery core and multiple coatings layered on the core wherein each coating comprises a substance which is impermeable to water but lickable for consumption and wherein at least one coating layer contains a water-soluble colorant component so that upon licking for consumption, colorant is released from the layer for providing coloration.

18. A frozen confectionery article according to claim 17 wherein each coating layer comprises a fat-based substance which contains a water-soluble colorant component and wherein the colorant of each coating layer is different one from the other.

19. A frozen confectionery article according to claim 17 wherein at least one impermeable coating layer comprises a fat-based substance and a colorant component selected from the group consisting of a fat-soluble colorant and a lake.

20. A frozen confectionery article according to claim 17 or 18 or 19 wherein there are first and second coating layers and wherein the first coating layer surrounds the core and the second layer is coated only upon portions of the first layer.

* * * * *